(12) United States Patent
Champagne

(10) Patent No.: US 6,843,396 B2
(45) Date of Patent: Jan. 18, 2005

(54) BAG CARRYING BICYCLE RACK

(76) Inventor: Marcel Champagne, 6370 Boul Roi René, Anjou, QC (CA), H1K 3G3

( * ) Notice: Subject to any disclaimer, the term of this patent is extended or adjusted under 35 U.S.C. 154(b) by 12 days.

(21) Appl. No.: 10/617,300

(22) Filed: Jul. 11, 2003

(65) Prior Publication Data
US 2004/0011836 A1 Jan. 22, 2004

Related U.S. Application Data
(60) Provisional application No. 60/395,992, filed on Jul. 16, 2002.

(51) Int. Cl.[7] .............................................. B62J 11/00
(52) U.S. Cl. ....................... 224/422; 224/426; 224/431; 224/438
(58) Field of Search ................................ 224/422, 423, 224/428, 429, 430, 431, 432, 438, 440, 446, 458, 463, 425, 426

(56) References Cited

U.S. PATENT DOCUMENTS

| | | | |
|---|---|---|---|
| 610,251 A | * | 9/1898 | Wall ........................... 224/432 |
| 3,786,972 A | | 1/1974 | Alley |
| 3,934,770 A | * | 1/1976 | Larsen ........................ 224/429 |
| 3,937,374 A | | 2/1976 | Hine |
| 3,938,716 A | | 2/1976 | Jackson |
| 4,301,952 A | | 11/1981 | McNeill |
| 4,353,490 A | | 10/1982 | Jackson |
| 4,433,802 A | | 2/1984 | Woolf |
| 4,450,988 A | | 5/1984 | Meisel |
| 4,562,944 A | | 1/1986 | Jackson |
| 4,662,548 A | * | 5/1987 | Jackson et al. .............. 224/432 |
| 4,666,071 A | * | 5/1987 | Irwin et al. ................. 224/452 |
| 4,869,408 A | * | 9/1989 | Lutz ............................ 224/417 |
| 5,244,132 A | | 9/1993 | Christen |
| RE34,474 E | * | 12/1993 | Lutz ............................ 224/417 |
| 5,350,093 A | * | 9/1994 | Sheely ........................ 224/422 |
| 5,667,117 A | * | 9/1997 | Nutto .......................... 224/417 |
| 5,803,328 A | * | 9/1998 | Nakahara ..................... 224/420 |
| 5,803,329 A | * | 9/1998 | Weissenberger et al. ..... 224/450 |
| 6,029,875 A | | 2/2000 | Johnston |

* cited by examiner

Primary Examiner—Stephen K. Cronin

(57) ABSTRACT

A bag carrying bicycle rack installed over the rear wheel of a bicycle. In order to more appropriately hold a knapsack, a stretchable "fishnet" is used as a means to hold the knapsack. Because it is stretchable, it can conform to a variety of irregular shapes and hold them very securely.

2 Claims, 1 Drawing Sheet

BAG CARRYING BICYCLE RACK

Figure 1:
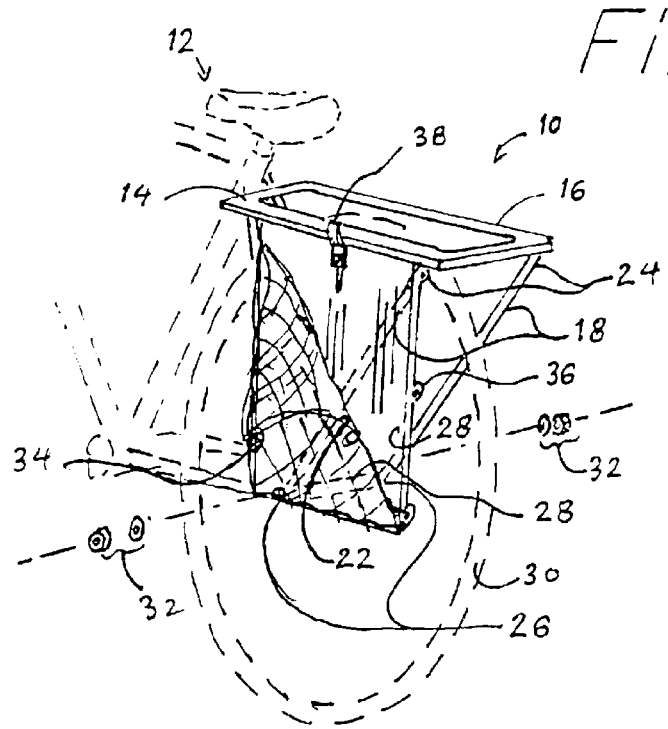

This application claims benefit of Provisional Application 60/395,992 filed Jul. 16, 2002.

BACKGROUND OF THE INVENTION

1. Field of the Invention

This invention relates to bicycle racks in general and more particularly to bicycle racks suitable for carrying a backpack or knapsack.

2. Background of the Invention

A variety of forms of racks, often caled "panniers" are available for attachment to horizontal carriers fixed over the rear wheel of a bicycle to extend downwardly, alongside the wheel. These panniers vary form one another in their convenience in loading and unloading their contents; the manner in which they are attached to the bicycle; their capacity; and other characteristics.

Such panniers include a platform rack mounted over the rear wheel by means of a system of strut members and forwardly projecting connectors which connect to the bicycle frame. The strut system is mounted adjacent to the axle of the rear wheel.

Most panniers are used for carrying parcels but the configuration of such panniers limits the variety of objects that can be carried in a safe and practical manner wherein the object or objects won't fall off the pannier. That is why in practical use, people have resorted to putting their carryons in a bag or knapsack which can be more securely attached to the pannier. The use of a bag is advantageous since the user is more familiar which the bag's size and configuration and therefore feels confident that objects placed inside will be secure and since they only have to figure how to attach the bag or knapsack to the pannier, since the bag or knapsack has a familiar size and shape, they can, feel confident that their bag or knapsack can be held securely to the pannier. More and more so, people are using standard knapsacks which have the advantage of being transportable off the bicycle as well. Also, knapsacks have certain standard elements such as straps and a certain level of conformity in shapes and sizes which makes them particularly suitable for a pannier or bike rack.

Unfortunately, the prior art does not provides for mounting systems that are very reliable and they may not securedly hold a knapsack in situations where the travel is bumpy and as such, the knapsack may be dislodged from the rack or pannier.

A more secure and simple, way to hold a knapsack needs to be found.

SUMMARY OF THE INVENTION

In order to more appropriately hold a knapsack, a stretchable "fishnet" is used as a means to hold the knapsack. Because it is stretchable, it can conform to a variety of irregular shapes and hold them very securely.

It is therefore an object of this invention to provide for a bag carrying bicycle rack which can be attached over the back wheel of the bicycle.

It is another object of this invention to provide for a bag carrying bicycle rack having a lightweight but rigid armature.

It is yet another object of this invention to provide for a bag carrying bicycle rack having an adjustable hook to partially hold a knapsack in place.

It is a further object of this invention to provide for a bag carrying bicycle rack having a stretchable fishnet as means to securely hold a knapsack in place.

It is a final object of this invention to provide for a bag carrying bicycle rack having a back panel sheet between the bicycle wheel and the knapsack in order to protect the knapsack for dirt, mud and water projected from the wheel.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE PREFERRED EMBODIMENT

FIG. 1 A perspective elevation showing a bag carrying bicycle rack installed on a bicycle (seen in dotted lines)

Figure 2:
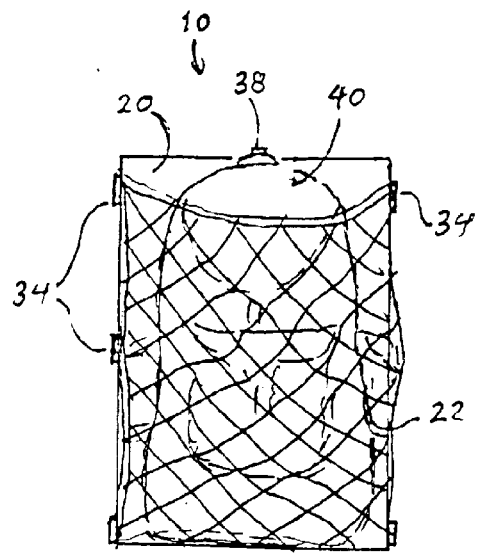

FIG. 2 Front elevation of the bag carrying bicycle rack with a knapsack inside and showing detail of the net and back panel sheet.

Figure 3:
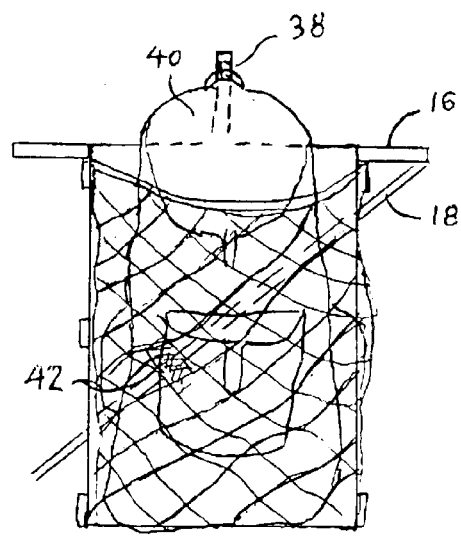

FIG. 3 Front elevation of a second embodiment of the bag carrying bicycle rack with a knapsack inside and showing an alternate attachment using the struts.

Figure 4A:
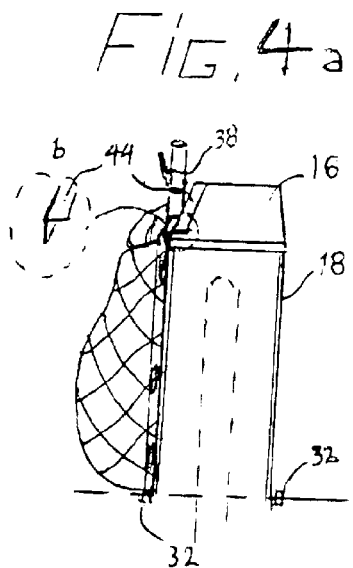

FIG. 4 A perspective rear elevation showing a bag carrying bicycle rack.

DETAILED DESCRIPTION OF THE PREFERRED EMBODIMENT

A bag carrying bicycle rack (10) is installed over the rear wheel (30) of a bicycle (12) and it is secured by a front attachment means (14) using any one of numerous means well known in the art. The bag carrying bicycle rack (10) uses either an existing bicycle rack (16) or is comprised of a similar component. The bicycle rack is further comprised of a pair of struts (18) situated on either side of the bicycle (12). The bag carrying bicycle rack (10) has a back panel sheet (20) to prevent any loose content from getting caught in the spokes of the bicycle wheel and a stretchable fishnet (22).

The struts (18) have proximal ends (24) attached to the rack (16) and distal ends (26) fixedly attached to the hub (28) of the rear wheel (30) of the bicycle (12) using the bicycle's own nuts and bolts (32).

The back panel sheet (20) extends vertically downwards from the horizontal part (16) to which it is fixedly attached and is attached at its lower part to the hub (28) using the same nut and bolt (32). During assembly, both the distal end (26) and the back panel sheet (20) are attached together.

A stretchable fishnet (22) is releasably attached to the back panel sheet (20) by way of releasably detachable means comprised of a first releasable part (34) and a second releasable part (36).

An adjustable hook (38) completes the invention. The adjustable hook (38) has one of several adjustable means well known in the art.

By hanging a bag (40) from the hook (38) and then attaching the stretchable fishnet (22), a bag (40) can be secured into the bag carrying bicycle rack (10).

In FIG. 3, a second embodiment of the bag carrying bicycle rack (10) shows a higher location for the adjustable hook (38) as well as a strut attachment (42) which makes attaching the bag carrying bicycle rack (10) much easier. Using An "L" shaped rod (44) as per FIG. 4ab can allow the use of a variety of existing bicycle racks (16) wherein the "L" shaped rod (44) is fixedly attached upon. With the use of the strut attachment (42) on an existing bicycle rack (16) there is no need to dismantle nuts and bolts (32).

What is claimed is:

1. A bag carrying bicycle rack installed over the rear wheel of a bicycle comprising:
   a front attachment means;
   a horizontal part;
   a pair of struts situated on either side of the bicycle;
   a back panel sheet;
   a stretchable fishnet;
   an adjustable hook to hold a backpack;
   said struts being fixedly attached by their distal ends to a rear wheel hub of a bicycle;
   said stretchable fishnet being releasably attached to the back panel sheet by way of releasably detachable means comprised of a first releasable part and a second releasable part.

2. A bag carrying bicycle rack installed over the rear wheel of a bicycle comprising:
   a front attachment means;
   an "L" shaped rod;
   a pair of struts situated on either side of the bicycle;
   a back panel sheet;
   a stretchable fishnet;
   a strut attachment to attach the lower part of said bag carrying bicycle rack to said strut;
   an adjustable hook to hold a backpack situated substantially higher than said "L" shape rod;
   said stretchable fishnet being releasably attached to the back panel sheet by way of releasably detachable means comprised of a first releasable part and a second releasable part.

* * * * *